United States Patent [19]

Freeman et al.

[11] Patent Number: 5,231,373
[45] Date of Patent: Jul. 27, 1993

[54] MULTI-LEVEL ILLUMINATION CONTROL SYSTEM FOR AUTOMOTIVE SIGNALLING USE

[75] Inventors: William H. Freeman, 324 S. Elm, St. Louis, Mo. 63119; John H. Scandrett, 6829 Waterman, St. Louis, Mo. 63130; John R. Durbin, 317 Kimberly La., St. Peters, Mo. 63376

[73] Assignees: William H. Freeman; John R. Durbin; John H. Scandrett, all of St. Louis, Mo.; a part interest to each

[21] Appl. No.: 723,453

[22] Filed: Jun. 28, 1991

[51] Int. Cl.$^5$ .............................. B60Q 1/50
[52] U.S. Cl. .......................... 340/469; 340/467; 340/479; 307/10.8
[58] Field of Search ............... 340/463, 464, 467, 468, 340/469, 479; 307/10.8; 362/61, 80, 80.1; 200/61.45 R

[56] References Cited

U.S. PATENT DOCUMENTS

| | | | |
|---|---|---|---|
| 2,474,610 | 6/1949 | Wunsch | 340/467 |
| 3,089,129 | 5/1963 | Nassikas et al. | 340/467 |
| 3,157,854 | 11/1964 | Riley | 340/467 |
| 3,533,496 | 11/1970 | Bumpous | 340/467 |
| 3,593,278 | 7/1971 | Bower | 340/467 |
| 3,665,391 | 5/1972 | Bumpous | 340/479 |
| 3,875,559 | 4/1975 | Szekessy | 340/479 |
| 4,231,013 | 10/1980 | Freeman et al. | 340/479 |
| 4,258,353 | 3/1981 | Carlson | 340/467 |
| 4,357,594 | 11/1982 | Ehrlich | 340/467 |
| 4,952,909 | 8/1990 | Woerner et al. | 340/464 |
| 4,958,143 | 9/1990 | Knauff | 340/479 |

*Primary Examiner*—Jin F. Ng
*Assistant Examiner*—Jeffery A. Hofsass
*Attorney, Agent, or Firm*—Kalish & Gilster

[57] ABSTRACT

A vehicular-borne illumination control system of the invention for vehicular use automatically controls intensity of a signal light source, i.e., center mounted brake signal, as a function of one or more safety-affecting parameters, e.g., deceleration and/or light level or other ambient condition including fog or precipitation as sensed by sensor(s) of the system. MOSFET switching controls energization of the light from vehicle power, with capability of providing different possible illumination levels by duty cycle control. A microcontroller is responsive sensor input for controlling the duty cycle to vary energization of the light source for transition between said different illumination levels. The transition is thus able to be varied according to a time-varying function, as effectively by spiked over-driving or underdriving, to compensate for human physiological inability to perceive change in the different intensity levels or states.

24 Claims, 2 Drawing Sheets

MULTI-LEVEL ILLUMINATION CONTROL SYSTEM FOR AUTOMOTIVE SIGNALLING USE

BACKGROUND OF THE INVENTION

The invention relates to systems for electronic control of light sources and more particularly to a microprocessor-driven system for automatically controlling and varying the intensity of vehicle signal lights used for signalling drivers of following vehicles to show braking and deceleration.

For a number of decades it has been conventional practice for domestic and foreign producers of vehicles to equip them with dual light sources, referred to as brake lights, to signal the application of brakes. Such brake lights are used for reasons of safety, and are required by regulatory authority in this and other nations.

More recently, regulatory authority has promulgated, in the interest of safety, the implementation of vehicle center-mounted brake light signals which are thus physically separated from vehicle running lights in order that following drivers might more promptly and reliably be able to gain greater perception of the application of brakes in a vehicle so equipped.

Brake lights, as today used in the automotive industry, whether mounted in conventional pairs or center-mounted, do not conventionally indicate more than that the vehicle operator has applied brakes; and indeed it has been conventional for many decades simply to energize the brake lights from the vehicle electric power source in response to closure of a switch operated either by movement of a brake mechanism (e.g., pedal) or by increase in pressure of hydraulic fluid used to directly activate brake devices. Thus, brake lights conventionally are switched either on or off without modulation of intensity.

Nevertheless, it has long been proposed in the patent and other technical literature to vary brake light intensity or switching rate (e.g., by flashing action) as a function of brake pressure or as a function of the magnitude of deceleration brought about by braking. The use of various inertia-responsive devices such as springs, decelerometers, and pendulums has been proposed in the literature for responding to vehicle rate of negative acceleration. U.S. Pat. Nos. 2,474,610; 3,089,129; 3,157,854 are instructive in that regard, as are more recent U.S. Pat. Nos. such as 4,357,594; 4,258,353; and 3,875,559. U.S. Pat. Nos. 3,538,496; 3,665,391; and 3,593,278 may also be noted as illustrative of the state of art.

In general, such art may be characterized as relating either to (a) devices of type for varying brake light intensity as a function of a parameter (e.g., deceleration), or to (b) devices of types for varying a flash rate as a function of some such parameter. The present invention relates to devices of type (a).

Recent U.S. Pat. No. 4,952,909 as well as U.S. Pat. No. 4,357,594 are both to be noted as relating to the use of microprocessor circuitry for brake light control in response to deceleration or velocity, even though said U.S. Pat. No. 4,357,594 is a device of type (b) insofar as there is proposed therein control only of blink rate of a warning indicator in proportion to a degree of hazard sensed according to change in deceleration, brake pressure, motion or speed thereby to alert a following driver to a potential hazard. Recent U.S. Pat. No. 4,958,143 teaches combining a conventional brake light with a flash lamp thereby to alert a following driver simply of the application of brakes.

Freeman et al U.S. Pat. No. 4,231,013 of present inventor W. H. Freeman and another teaches a concept of controlling the duty cycle of a pulse-form signal provided for energization of vehicle brake lights for purposes of controlling brake light intensity in stepwise manner as a function of brake pressure. The present invention is deemed to be an improvement over the system of such patent.

SUMMARY OF THE INVENTION

It has been determined to be desirable not only to bring about stepwise change in brake light intensity for signalling in accordance with said Freeman et al U.S. Pat. No. 4,231,013 but also to cause such intensity to vary as a function of vehicular change in velocity, as measured by deceleration experienced by the vehicle during braking, quite apart from brake force applied, as it is recognized that brake force is under certain conditions not exclusively or precisely determinant of deceleration in view of the fact that a given degree of brake force will produce different rates of deceleration dependent upon vehicle speed, motive power applied, and road conditions. Indeed, aerodynamic drag (as both induced and form drag) is a velocity-dependent braking force for a vehicle, quite apart from whether the operator has made a deliberate application of braking force.

At the same time, it is recognized by the invention that employment of stepwise change in the intensity of a signal device, whether as a brake light per se or as a warning light for the following driver as an adjuct to conventional brake lights must contend with and desirably compensate for, the physiological relative inability of the human eye to discriminate between different levels of illumination, a characteristic unique to the individual and subject to some substantial degree of variation among any set of individuals, whereas an individual of normative capability for discernment of intensity level differences between two or more different levels may be able to act rationally upon cognitive perception of change between such levels (where, for example, illumination intensity is advanced from one level to the next upon increase in deceleration), it can be demonstrated that physiological-psychological factors may induce a lag in perception of such change in intensity.

Yet another factor of no little consequence stems from the desirability of use, for signalling, of conventional incandescent filament devices. As compared with solid state photodiode emitters having essentially negligible lag, at least for purposes of physiological perception and response, in photon emission upon application of energizing potential, the ubiquitous incandescent filament, being ohmic and of finite mass, exhibits very substantial thermal lag in reaching a preselected intensity level upon commencement of current flow therethrough. Thus, in stepping from one current level to a next higher current level for achieving a desired stepwise intensity increase, the filament heating level does not rise in true stepwise manner but rather exhibits a transient response according to the thermal lag characteristic which only further degrades the capability of the human eye to perceive a stepwise intensity increase. There is similarly a lag in attempted stepwise decrease in intensity. Even when an incandescent bulb is merely switched on and off, even without stepwise change, the warm-up time creates a delay in illumination which it would be desirable to minimize and so increase eye perception of such switching of illumination state.

In the context of busy vehicular traffic, in which a vehicle may closely follow another at relatively high speed, any such physiological-psychological or thermal lag, whether for intensity increase or decrease, substantially may compromise safety by denying a following driver the capability of acting quickly in response to a change of brake or warning signal intensity exhibited by the vehicle ahead, whether as a change of illumination state or an increase from one level to another.

Whether such signal intensity is increased or decreased by a stepwise increment, it is desired and provided by the present invention to control intensity in an anticipatory, accelerated manner by further varying intensity as a function of time from the plurality of stepped intensity values otherwise to be achieved.

While, as noted, the intention is intended for controlling the intensity of various possible types of light signalling devices, including brake lights useful now or at some time for vehicular optical signalling purposes, all such brake lights and signalling devices, whether incandescent or not, for convenience herein be referred to simply as "signal lights."

Accordingly, among the several objects of the invention may be noted the provision of an improved illumination control system for vehicular use which automatically controls the intensity of illumination provided by a signal light as a function of change in a parameter affecting safety, e.g., responsive to vehicle movement, and specifically change in acceleration thereof, as when decelerating upon braking; which provides for control of intensity by variation in pulse duty cycle as a function of any such sensed parameter; which is responsive, for such intensity-control purposes, to various parameters such as (without limitation) day or night conditions and ambient light levels and weather conditions; which provides stepwise change in intensity, or intensity change of state, for such signal light in response to a sensed parameter; which is microprocessor-driven to provide anticipatory, compensated time-varying change in the intensity from one state to another or from one step level to another in accordance with an energization function which varies nonlinearly and in nonstepped manner such as to bring about a perceived stepwise change by compensation for physiological-psychological factors, as well as thermal inertia factors; which can provide accelerated operation of signal devices such as will effectively compensate for illumination delay resulting from such thermal inertia; which can vary energization provided by a power source to the light source for transition between said different illumination levels or states thereof according to a time-varying function compensating for physiological inability to perceive change in said different intensity levels; which can markedly reduce the delay in transition from one display state to another and so reduce if not effectively substantially eliminate the delay in perceiving the change of state; which can provide step-emphasized change in intensity level for marked reduction in human perception time; which operates a light signal display device not only more quickly but also more noticeably; and which as used for vehicle deceleration or so-called brake light signalling can provide marked increase in vehicular safety, by allowing drivers to avoid collisions through enhanced perception of vehicular hazards.

Briefly, an improved illumination control system of the invention for vehicular use automatically controls intensity of a signal light source as a function of at least one safety-affecting parameter, the system being provided with a vehicular electrical power source for powering the light source, and including or comprising or being comprised essentially of a controllable semiconductor means for controlling energization provided by the power source for the light source and capable of providing a plurality of different illumination levels of the light source, at least one sensor for sensing such a parameter, and a microcontroller means responsive to such sensor for controlling the semiconductor means as a function of such parameter and operative to cause the semiconductor means to vary energization provided by the power source to the light source for transition thereof between said different illumination levels. The transition of the light source between different illumination levels is thus able to be varied according to a time-varying function compensating for physiological inability to perceive change in said different intensity levels.

DESCRIPTION OF THE PREFERRED EMBODIMENTS

Figure 1:
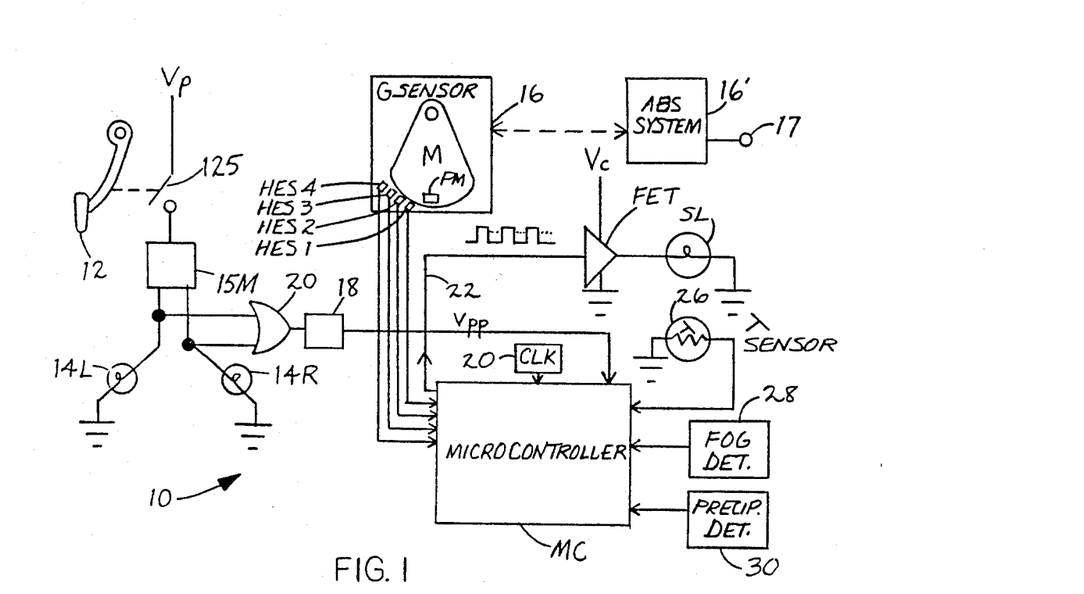
FIG. 1 is a schematic circuit diagram of an illumination control system in accordance with and embodying the present invention.

Referring now to FIG. 1, a vehicular-borne microprocessor-driven system 10 automatically controls and varies the intensity of a signal light SL such as used for a center-mounted brake light of the type previously noted, and thus used to supplement the usual pair of appropriately disposed left and right brake lights 14L, 14R powered from the vehicle voltage source Vp through closure of a brake switch 12S activated by depressing of the usual brake pedal 12. The brake light circuit may typically include a brake light circuit module 15M with separate outputs to each brake light.

The present system is G-force responsive, i.e., is deceleration responsive, causing increase in the intensity of the center mounted brake light SL as a function of stepwise rate of change of deceleration of the vehicle, regardless of variation in brake pressure (although braking force will under ordinary circumstances primarily control and determine deceleration). For this purpose there is provided an accelerometer 16.

The intensity of light SL is controlled by a field effect transistor FET, being preferably of MOSFET type, for providing semiconductor control of current supplied to the brake light in response to a pulse-form control signal provided by a microcontroller MC, according to the duty cycle of such signal, which is varied automatically by the microprocessor as a function of known semiconductor microcontroller unit which includes its internal read-only memory EPROM programmed according to the invention for controlling the operation of the output or control signal in accordance with inputs provided to MP.

Accelerometer 16, simply termed for convenience a G-sensor, is formed by a pendulum having a mass body M and carrying a permanent magnet PM for movement along Hall-effect switches HES 1-4 in response to increasing deceleration. Thus, it will be understood that as the vehicle experiences increasing deceleration, switches HES 1-4 will be actuated in sequence to a microcontroller MC operating in response to a crystal clock 20 when enabled. Sensor 16 may equivalently be provided by an antilock or antiskid brake system (ABS) 16' with a wheel sensor 17 which with a time clock (as internal or with MC) determines rate of deceleration and/or wheel slip from time-velocity relation namely by deriving deceleration rate by the relation of the angular velocity of a vehicle wheel to time constraint, e.g., sensing deceleration rat increase or decrease of pulse sensor inputs compared to a time base.

Power for enabling microcontroller MC may be a suitable voltage V provided by a voltage regulator 18 which receives the vehicle battery voltage Vp through operation, in effect, of a logical OR-gate 20, if either brake light is energized. Such circuits form part of known brake light energization circuits.

Microcontroller MC may be provided by implementation of commercially available type MC68705R3, being of 8-bit type which is programmed in EPROM to implement a routine by program cycling at a rate nominally of 2000/sec, for controlling an output signal 22 which gates the FET on or off to energize signal light SL from a suitable voltage source Vc. More specifically, the program in EPROM is intended to control the duty cycle of the rapidly pulsing signal 22 (e.g. at 80 pulses per second) provided to the FET. As the duty cycle of the pulses increases (i.e., the pulse width increases), the brake light energization level will increase, since the average current flowing through SL will increase with increasing pulse width. By controlling the duty cycle, the intensity can be precisely controlled by microcontroller MC. Such pulse repetition rate (p.r.r.) is sufficiently great that signal light SL when energized remains steadily illuminated, even though its intensity will vary according to change in the average power supplied by the energizing current, because the human eye cannot perceive such a rapid pulsing effect (and also because of filament thermal lag effects), just as the changing from one frame to another in a motion picture does not cause a perceptible flicker.

The program in EPROM is also such as to bring about the novel effect of allowing the energizing current to be overdriven or underdriven, i.e., selectively over-compensated under direct control of microcontroller MC, whereby to cause accelerated change in the level of illumination provided by signal light SL in transitioning from one illumination level to another. That is, the change in illumination level of SL may be accelerated when increased from one level to the next or, contrariwise, may be decreased more quickly in transition from one level to a next lower, non-zero level.

In accordance with the teaching of previously-identified Freeman et al U.S. Pat. No. 4,231,013, herein incorporated by reference, it has been proposed to provide energization of a brake light so that its perceived intensity changes as a stepped function of braking pressure. Such effect is shown in FIG. 5 of said Freeman et al patent.

Figure 3:
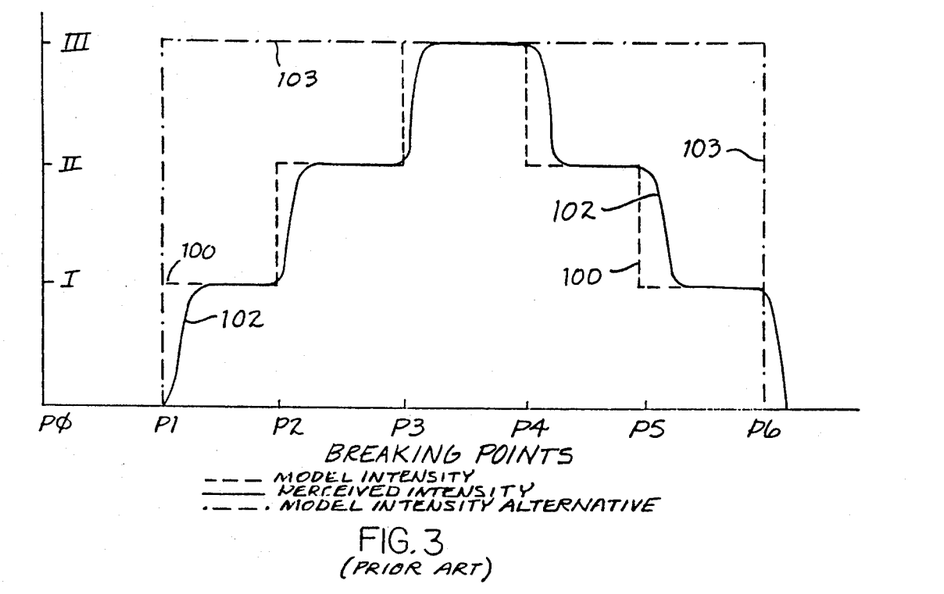
FIG. 3 is a graph illustrating energization and intensity levels as a function of braking, for a signal light according to prior art.

Referring herein to FIG. 3, a graph shows by dashed line a first characteristic 100 in the form of a theoretical preselected model function of signal light intensity wherein the intensity begins initially at zero, as where signal light SL is not energized, and then steps successively to relative percentage levels I, II, III (which may be 100% of normal full intensity but less than a maximum possible intensity) upon successive corresponding braking points P1, P2, P3 which may represent advancing brake pressure levels according to Freeman et al U.S. Pat. No. 4,231,013.

As brake pressure is reduced at points P4 and P5, and finally released at P6, the model intensity drops to level II and then level I and finally returns to zero. In practice, the model step-form function 100, regardless of relative actual percentages of intensity (such as 50%, 60%, 70%, 80% and so on) and number of steps, is not achieved because of thermal lag of an incandescent light source employed. An actual characteristic approximated at reference numeral 102 shows edge-rounding according to the result of delay in filament heating and asymptotic approach to a preselected illumination level such as I, II or III. Following drivers accordingly are not able visually to perceive a sharp transition from one level to the next. A reduction in intensity level similarly results because of thermal lag, in nonidealized, edge-rounded transition making more difficult the perceiving of a decrease in illumination intensity. The inability of a driver quickly to perceive a relative change in intensity and/or change in state degrades driver response time by adding cognitive processing delay to normal physiologic conditioned response. Reference numeral 103 indicates by dot-and-double dash representation a simplified single-step function corresponding to change in state between zero and a single-valued intensity, as corresponds to conventional on-off switching.

Figure 4:
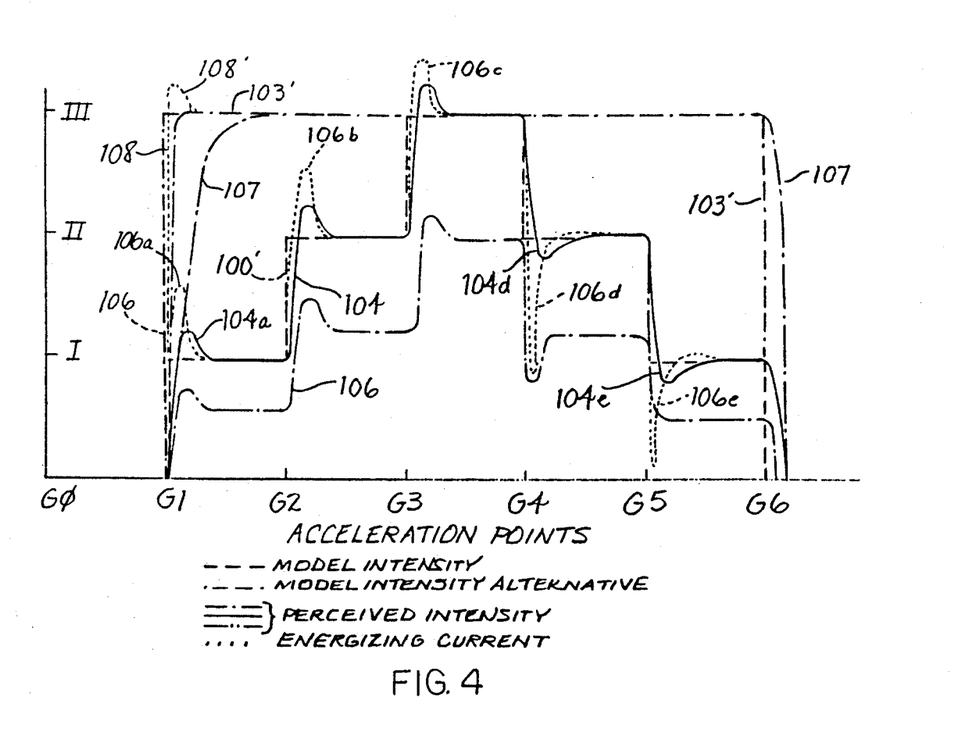
FIG. 4 is a graph illustrating energization and intensity levels as a function of braking, for a signal light according to the present invention.

Referring to FIG. 4, implementation of the invention makes possible an improved intensity characteristic, as compared with the idealized model intensity function 100' where, as before, levels I, II, III might correspond with increasing acceleration values G1, G2, G3 respectively measured by accelerometer 16, and where G4, G5, G6 constitute decreasing points of acceleration values. Reference numeral 103' indicates a simplified model function involving change of state from zero intensity.

Such an improved characteristic in perceived intensity is represented by a curve such as that designated 104 by selectively overcompensating the energizing current, as shown by one possible characteristic 106 wherein, at a first perceived acceleration G1 (as measured by Hall-Effect device HES1), intensity is to increase to level I such as, for example, about 40% of full normal intensity. According to the characteristic 106, the energizing current effectively may be "spiked," as shown by spike 106a so as to overdrive signal light SL by a current value substantially in excess of the level required for maintaining illumination at level I. By preselection of the overdriving level, the illumination characteristic can be made to closely follow model curve 100; but more advantageously, a corresponding illumination peak or "spike" 104a can be achieved. Similar overdriving by current spikes 106b, 106c can produce illumination spikes 104b, 104c which like that at 104a will be visually perceived quickly by a following driver who may then be expected to react more quickly to the perceived upward stepping of the intensity. The current spike 106c may provide an intensity spike 104c which is in excess of the nominal value III normally selected for full illumination.

Downward "spiking" is similarly possible, whether to cause the illumination pattern 104 to more closely follow a model curve as that shown at 100; or more advantageously, to cause a slight dip in intensity with each downward step. Thus, for example, current underdriving as shown at 106d and 106e brings about corresponding dips 104d, 104e in perceived intensity by momentarily reducing energization below the level required for illumination at a next proximate lower level. Such may be regarded conceptually, if simplistically, as downward "spiking," being in the same sense negative overcompensation, with the advantage that a driver following the equipped vehicle may more quickly perceive that intensity has dropped from one plateau to a next.

Such intensity overcompensation, whether by "spiking" up or down, is provided as a visual cue for alerting the following driver as well as for providing compensation for the relative inability of the human eye to discern changes in light intensity as between two adjacent levels.

For operation of such signal light SL to provide a two-state model function 103' varying between a zero intensity value and a normal single valued intensity III, a normal characteristic 107 exhibits delay resulting from thermal inertia. Yet, by overdriving under microprocessor control of the invention to provide a characteristic energizing current (here normalized to the intensity) as shown by the fragmentary curve 108 (including a current spike 108') an illumination curve 109 (here fragmentarily shown by dash-and-double dot portion extending only to the steady-state illumination level III) exhibits an improved result, perceptive visually as a seemingly "instant on" effect nearly completely devoid of perceptible lag. Transition to level III may also be carried out with a visual peak or "spike" for attention-getting effect if desired, as above described for multiple step transition.

Although FIG. 4 demonstrates three primary intensity levels I, II, III (e.g., 40%, 75% and 100% of nominal full value), a greater or fewer number of levels is also possible. Further, the intensity levels illustrated are merely for purposes of illustration and are not meant necessarily to indicate actual percentages or values but rather only to show relativity.

Referring again to FIG. 1, the invention is also responsive to ambient light level, and so includes a light sensor 26 of photoresistive type, e.g., a phototransistor, for providing an input to microcontroller MC which will reduce relative intensity levels for signal light SL at night or when ambient light level is otherwise below a predetermined threshold value. Such reduction in intensity may be used to provide for a single downward shift in all relative intensity levels, or else to provide for shifting of such intensity levels as a monotonic linear or nonlinear function of sensed ambient light level. For either purpose light sensor 26 may be oriented within a case for signal light SL having an aperture to admit exterior ambient light, and oriented so as to look ahead of the vehicle, if desired. Such case may also house microcontroller MC, sensor 16 and components 18 and 20.

FIG. 4 shows a characteristic 108 showing downward shifting of the multiple intensity levels as a function of reduced ambient light level, e.g., night.

Other inputs for shifting relative levels in response to change in atmospheric conditions are shown provided in FIG. 1 in the form of a fog detector 28, which may be a known photoelectric device responsive to reduced light transmissivity in moisture-laden air, so as to increase relative intensity levels for signal light SL if fog is detected. Similarly, a precipitation detector 30 of known type may be used to provide a microcontroller input causing relative illumination levels to be shifted upwardly if, for example, rain is detected.

Figure 2:
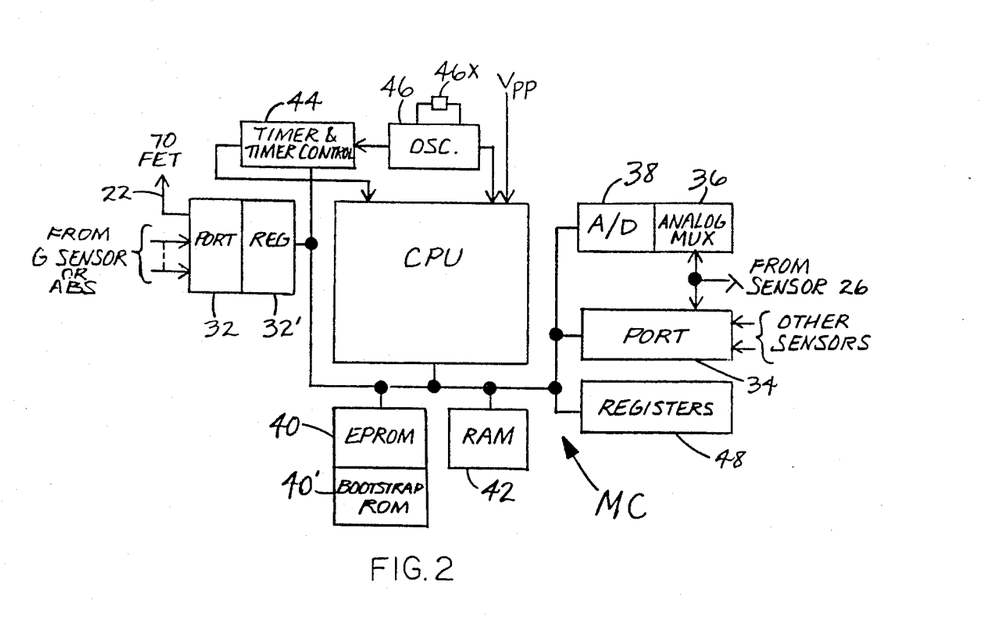
FIG. 2 is a further schematic circuit diagram of portions of FIG. 1.

FIG. 2 illustrates salient features of microcontroller MC including a port 32 and associated register 32, for receiving inputs from accelerometer 16 and providing also the pulse-width modulated control signal 22. The microcontroller includes also at least an additional port 34 and registers as at 34' for receiving sensor inputs, e.g., from devices 26, 28 and 30. Light sensor 26 provides input through an analog multiplexer 36 for analog-to-digital conversion by A/D converter 38 for processing by central processor unit CPU of the microcontroller. An addition to EPROM at 40 bootstrap ROM is also provided as 40', as conventional for boot operation according to a bootstrap program; and RAM is provided as shown at 42 for use during processing by the CPU. The microcontroller includes a timer and time control 44, for which an oscillator 46 for which crystal 46x provides a clock standard. Other suitable registers 48 are provided.

The microcontroller is powered entirely by voltage source Vpp so that the mode of operation is that the microcontroller is powered up and initialized on each application of brakes, and thus enabled for driving FET to illuminate SL upon deceleration sensed by G-sensor 16.

For programmed self-initialized EPROM-instructed operation of microcontroller MC according to the invention, programming representively is as follows:

Definitions of constants are given as:

TABLE 1

P CLS ( CONSTANTS )
( PENDULUM THRESHHOLDS )
: LEVEL1 − 2 ; : LEVEL1 + 2 ;
: LEVEL2 − 3 ; : LEVEL2 + 4 ;
( DAY/NIGHT THRESHHOLD )
: D/N.THRESH 120 ;
( A/D REGISTERS )
: MR       $0A ; ( MISC REGISTER INT2 MASK )
: ACR     $0E ; ( A/D CONTROL REGISTER )
: ARR     $0F ; ( A/D RESULT REGISTER )
( STEP CHANGE FLASH DURATION )
( IN .5 MS UNITS )
: DELTA 250 ;

RAM definitions are given as:

TABLE 2

| RAM ORG6 | | ( STORAGE DEF'S ) |
|---|---|---|
| : D/N | DB6 ; | |
| : D/N.AVG | DW6 ; | : D/N.CNT DB6 ; |
| : STATE | DB6 ; | |
| : STRAIN | DB6 ; | |
| : ON.CNT | DB6 ; | : OFF.CNT DB6 ; |
| : ON.HOLD | DB6 ; | : OFF.HOLD DB6 ; |
| : RAMU NEXRAM @ RAM − ; ( FREE=112−RAMU) | | |

An input/output definition is provided as:

TABLE 3

( BIT A0 TURNS ON MOSFET,
  WHICH TURNS ON BRAKE LIGHT )
: BRKLT PAD 0 ;

Macro definitions are provided as:

TABLE 4

: BRKLT.ON/ BRKLT BSET/ ;
: BRKLT.OFF/ BRKLT BCLR/ ;

TABLE 4-continued

```
: CLRW/ DUP CLR/ 1+ CLR/ ;
( PENDULUM HALL-EFFECT SENSOR BITS
    ARE PAD3... PAD6 )
( PENDULUM-IF: LO=ON)
: PIF/ PAD SWAP IFCLR/ ;
```

Bit definition, initializing instructions and variable setup are provided by:

TABLE 5

```
( THIS ROUTINE DEFINES PROCESSOR BITS
    AS INPUT OR OUTPUT, INITIALIZES
    THE BRIGHTNESS STATE TO ZERO, AND
    SETS UP RAM COUNTER VARIABLES )
LABEL INIT
    SEI/
    B00000001 PAD       MVI/ ( 0 HI )
    B00000001 PADDR     MVI/ ( 0 OUT,1–7 IN)
    B11111111 PBD       MVI/ ( 0–7 LO )
    B11111111 PBDDR     MVI/ ( ALL OUT )
    B00000000 PCD       MVI/ ( ALL LO )
    B00000000 PCDDR     MVI/ ( ALL IN )
    D/N.AVG CLRW/
    D/N.CNT CLR/ D/N CLR/
    255 ON.CNT MVI/ ON.HOLD STA/
    1 OFF.CNT MVI/ OFF.HOLD STA/
    STATE CLR/
    $40 MR MVI/
    TDR CLR/ $09 TCR MVI/
    RTS/
```

As representative of look-up tables with on/off time intervals establishing data cycles determinative of energization values corresponding to predetermined illumination levels, the following is typical:

TABLE 6

```
( PULSE WIDTH TABLE -- ON/OFF
    EACH LINE DEFINES THE ON/OFF RATIO
    FOR ONE OF THE STATE 0, 1, OR 2 )
LABEL PW.TBL
    10 B, 15 B, ( DAY    SET0 )
    15 B, 10 B, ( DAY    SET1 )
    24 B,  1 B, ( DAY    SET2 )
     7 B, 18 B, ( NIGHT  SET0 )
    12 B, 13 B, ( NIGHT  SET1 )
    20 B,  5 B, ( NIGHT  SET2 )
```

See instructions, i.e., subroutines, as are called accordingly for on/off state switching in response to increase or decrease in acceleration, are:

TABLE 7

```
( SET UP ON/OFF COUNTERS WHICH DETERMINE
    THE 3 BRIGHTNESS STATES )
LABEL SET0
    SEI/ 0 STATE MVI/ PBD 0 BCLR/
    PW.TBL 0 + ,X LDA/ ON.HOLD STA/
    PW.TBL 1 + ,X LDA/ OFF.HOLD STA/
    CLI/ PBD 1 BSET/ PBD 2 BSET/
    RTS/
LABEL SET1
    SEI/ 1 STATE MVI/ PBD 1 BCLR/
    PW.TBL 2 + ,X LDA/ ON.HOLD STA/
    PW.TBL 3 + ,X LDA/ OFF.HOLD STA/
    CLI/ PBD 0 BSET/ PBD 2 BSET/
    RTS/
LABEL SET2
    SEI/ 2 STATE MVI/ PBD 2 BCLR/
    PW.TBL 4 + ,X LDA/ ON.HOLD STA/
    PW.TBL 5 + ,X LDA/ OFF.HOLD STA/
    CLI/ PBD 0 BSET/ PBD 1 BSET/
    RTS/
``` and

TABLE 8

```
( CHANGE STATE... SET1+ MEANS INCREASE
    TO STATE 1, ETC. )
LABEL SET1+
    SEI/ DELTA ON.CNT MVI/ 1 OFF.CNT MVI/
    SET1 JMP/
LABEL SET2+
    SEI/ DELTA ON.CNT MVI/ 1 OFF.CNT MVI/
    SET2 JMP/
LABEL SET1-
    SEI/ 0 ON.CNT MVI/ DELTA OFF.CNT MVI/
    SET1 JMP/
LABEL SET0-
    SEI/ 0 ON.CNT MVI/ DELTA OFF.CNT MVI/
    SET0 JMP/
```

Accelerometer levels are established according to the following instructions, which effectively read pendulum angle sensed by HES 1–4 (namely as portions 0 through 4):

TABLE 9

```
( THIS ROUTINE READS THE PENDULUM
    POSITION 0 THROUGH 4 )
LABEL GET.STRAIN
    6 PIF/ 4 STRAIN MVI/ ELSE/
    5 PIF/ 3 STRAIN MVI/ ELSE/
    4 PIF/ 2 STRAIN MVI/ ELSE/
    3 PIF/ 1 STRAIN MVI/ ELSE/
        0 STRAIN MVI/
    THEN/ THEN/ THEN/ THEN/ RTS/
```

An interrupt definition for gating FET on/off each half-millisecond with duty cycle determination according to Table 6, and for reading the resistance of sensor 26, is:

TABLE 10

```
( COUNT ON/OFF TIMES AND AVERAGE THE
    PHOTOTRANSISTOR DAY/NIGHT READINGS )
LABEL INTERRUPT
    PAD 7 BSET/
    ON.CNT LDA/
    IFNE/ BRKLT.ON/ ON.CNT DEC/
    ELSE/ BRKLT.OFF/ OFF.CNT DEC/
        IFEQ/ ON.HOLD LDA/ ON.CNT STA/
            OFF.HOLD LDA/ OFF.CNT STA/
        THEN/
    THEN/
    1 ACR MVI/ D/N.AVG LDA/
    WHILE/ ACR TST/
    BPL/ ARR ADD/ D/N.AVG STA/
    IFCS/ D/N.AVG 1+ INC/
    THEN/ D/N.CNT DEC/
    IFEQ/ D/N.AVG 1+ LDA/ D/N STA/
        D/N.AVG CLRW/
    THEN/
    PAD 7 BCLR/
    TCR 7 BCLR/ ( CLR INT-REQ )
    RTI/
```

Day/night threshold determination by brightness table offset in response to sensor 26 is provided by:

TABLE 11

```
( SET BRIGHTNESS TABLE OFFSET...
    ( X REG ) FROM DAY/NIGHT CONDITION )
LABEL GET.D/N
    D/N LDA/ D/N.THRESH # CMP/
    IFHI/ 6 # LDX/ ( SET NIGHT )
        PBD 3 BSET/
    ELSE/ 0 # LDX/ ( SET DAY )
        PBD 3 BCLR/
    THEN/
    RTS/
```

A primary routine for setting level during program looping following initialization and setup, operating to read the pendulum position and changing the brightness state, if a position change so indicates, is:

TABLE 12

( READ PENDULUM AND CHANGE STATE, IF APPROPRIATE )
LABEL SET.LEVEL  GET.STRAIN JSR/
GET.D/N JSR/ STATE LDA/
IFEQ/STRAIN LDA/ LEVEL1+ # CMP/
IFHS/SET1+ JSR/ELSE/ SET0 JSR/
THEN/
ELSE/ 1 # CMP/
IFEQ/ STRAIN LDA/ LEVEL1− # CMP/
IFLO/ SET0− JSR/
ELSE/ LEVEL2+ # CMP/
IFHS/ SET2+ JSR/ ELSE/ SET1 JSR/
THEN/
THEN/
ELSE/ 2 # CMP/
IFEQ/ STRAIN LDA/ LEVEL2− # CMP/
IFLO/ SET1− JSR/ ELSE/ SET2 JSR/
THEN/
ELSE/ SET1 JSR/
THEN/
THEN/
THEN/ RTS/

Such setup routine is provided for operation upon each powering up with interrupt vector, as:

TABLE 13

( SETUP START/INTERRUPT VECS )
( SETUP COLD/WARM START, INT VECTORS )
( MAIN TI SET )    MAIN II SET
MAIN SW1 SET    MAIN RST SET
( CLOCK-INT)
INTERRUPT TI SET
( RC CLOCK = $80.
 X-TAL, INT-CLK. /8 = $03 )
$00 MOR BSET    ( X-TAL CLOCK )
ASMSTAT

The main program to be implemented is:

TABLE 14

( RESET PROCESSOR AND INITIALIZE )
LABEL MAIN
RSP/ INIT JSR/
( EXECUTE BRIGHTNESS CONTROL LOOP UNTIL BRAKELIGHT POWER GOES AWAY )
WHILE/
SET.LEVEL JSR/
RPTL/

It will be understood from the latter table that microcontroller MC when reset upon powering up in response to brake application calls the initialization routine of Table 5 and then loops in the level setting routing (Table 12) which effectively reads the pendulum angle detected by HES-1-4 and then, based on change in such angle, determines table values for energizing levels by on/off switching of FET.

Accordingly, it is understood the manner by which the invention controls light intensity in response to HES1 sensing first level of deceleration to cause signal light SL to illuminate to a peak value, and then fall to a slightly lower level. Thus, to the driver of a vehicle following the car equipped with the present system, the light SL will appear to come on brightly, but almost immediately reduces its brightness to a steady value. Then upon moderate braking pressure, producing further deceleration, as sensed by switch HES2, the program causes the light threshold to be switched to a much higher value, and then almost immediately fall to a steady next-plateau value. This procedure is repeated, with further threshold values, each time with a "peaking" or "spiking" of the light level increase, so as to overcome the tendency of the human eye not readily to perceive a normal stepwise increase in intensity; otherwise, the driver following might not be able to determine that light intensity had increased. Then, as the negative acceleration is decreased, the reverse effect is carried out by the program. That is, when the intensity is reduced in stepwise fashion, a reverse "spiking" is carried out desirably by allowing the intensity to fall to a value lower than a steady value. That is, negative "spiking" (namely under-energization) is carried out to enable the driver following to perceive that there has been a marked decrease in intensity. The variation in intensity during such upward/downward "spiking" is relatively rapid, occurring over only milliseconds, greatly adding emphasis to the change in light intensity with each upward or downward step.

It is further advantageous to control the intensity as a function of light level. At night, it is not necessary to operate the brake light BL at such high levels. There may also be input for fog or rain conditions to cause the light intensity to be greater than it otherwise would, or to cause the light intensity to step to a higher threshold than it otherwise would, such as by by-passing the effect of the first switches HES1 or HES2, etc.

Operation may as noted be as simple so as to provide only two perceptible levels, i.e., a first level low intensity or zero-valued intensity and a second-level higher intensity, but in each case accelerating or "spiking" the change in intensity (whether up or down) to provide a change which is more perceptible than otherwise, such being implemented by the new control system by the onset of brightness through increasing overdriving so as to more quickly develop a predetermined brightness level than would occur in response to a prior art technique of simply switching on signal light SL (whether by a known brake light switch or by semiconductor switching).

Furthermore, operation of the new system for driving the output device SL can provide the advantageous result of causing the output of signal device SL to conform more closely to a preselected model function, such a single or multiply stepped function illustrated or other desired time-varying function, than could otherwise be achieved by prior art technique heretofore used for vehicular light control and signalling.

Thus, there is provided an illumination control system for vehicular use for automatically controlling the intensity of a signal light source as a function of at least one safety-affecting parameter, including a vehicular electrical power source for powering the light source, means for controlling energization provided by the power source for the light source by change of the degree of energization thereof, means for sensing such a parameter, and wherein the microcontroller provides an improvement comprising means, responsive to the sensing means, for causing the energization controlling means to change the degree of energization of the light source in accelerated degree in response to the sensed parameter, whereby to shorten the response time in perceiving change in intensity resulting from energization.

In such control system the light source normally has thermal inertia, and the microcontroller causes the FET to change the degree of energization of the light source providing overdriving of the light source in changing the degree of energization, whereby to overcome such thermal inertia. The degree of energization of the light source is changed to provide at least two levels of illumination, the overdriving providing accelerated change in transition from one level to another. According to one desirable mode of operation of the new control system, the light source is operative to provide transition to at least one normally steady level of illumination when energized, and the microcontroller causes the FET to change the degree of energization of the light source providing overdriving of the light source in transition to such steady level of energization for producing a level of illumination momentarily greater than the steady level of illumination, according to what has been termed "spiking" of the light level.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. An improved illumination control system for vehicular use for automatically controlling the intensity of a signal light source as a function of at least one safety-affecting parameter, comprising a vehicular electrical power source for powering the light source; controllable semiconductor means for controlling energization provided by the power source for the light source and capable of providing a plurality of different illumination levels of the light source; at least one sensor for sensing such a parameter; microcontroller means, responsive to said at least one sensor, for controlling the semiconductor means as a function of such parameter and operative to cause the semiconductor means to vary energization provided by the power source to the light source for transition thereof between said different illumination levels.

2. Control system according to claim 1 wherein the transition of the light source between different illumination levels varies according to a time-varying function compensating for physiological inability to perceive change in said different intensity levels.

3. Control system according to claim 2 wherein the transition of the light source between different illumination levels provides spiked transition resulting from selectively compensated energization of the light source determined by the microcontroller.

4. Control system according to claim 3 wherein the transition of the light source between different illumination levels provides an accelerated increase in transition from one illumination state to another.

5. Control system according to claim 3 wherein the accelerated increase in transition from one illumination to another produces effectively an initial spiking of the illumination level.

6. Control system according to claim 4 wherein the microcontroller is operative to provide transition from one illumination level to a next higher illumination level by initially causing the semiconductor means to provide a higher level of energization to the light source than necessary to maintain the next higher level, whereby the change in illumination level of the light source is accelerated when increased from one level to the next.

7. Control system according to claim 4 wherein the microcontroller is operative to provide transition from one illumination level to a next lower illumination level by initially causing the semiconductor means to provide a lower level of energization to the light source than necessary to maintain the next lower level, whereby the change in illumination level of the light source is accelerated when decreased from one level to the next.

8. Control system according to claim 2 wherein each of the light levels is a different plateau according to a step function, and wherein the time-varying function compensates for physiological inability to perceive change in intensity from one plateau to the next by accelerated rate of change from one plateau to the next.

9. Control system according to claim 1 wherein the parameter sensed is deceleration of a vehicle carrying the system.

10. Control system according to claim 9 wherein the sensor is an accelerometer for sensing deceleration of a vehicle carrying the system.

11. Control system according to claim 10 wherein the accelerometer includes a mass movable according to deceleration experienced by the vehicle, and the sensor includes means for providing to the microcontroller stepwise signalling of the movement of the mass according to stepwise change in the deceleration.

12. Control system according to claim 1 wherein the sensor is an ABS system and the parameter sensed is deceleration of a vehicle carrying the system, as sensed by the ABS system.

13. Control system according to claim 1 wherein the parameter sensed is change in ambient light and the sensor is a light sensor of a vehicle carrying the system.

14. Control system according to claim 1 which is responsive to a plurality of such parameters, and the parameters are deceleration and an ambient condition, the system including both an accelerometer and ambient condition sensor providing input to the microcontroller for controlling energization of the light source as a function both of acceleration and the ambient condition.

15. Control system according to claim 14 wherein the ambient condition is light level.

16. Control system according to claim 1 wherein the microprocessor provides means for threshold determination of ambient light level as between day and night conditions, the microprocessor operating to provide relative shifting of different levels of illumination of the light source according to day and night conditions.

17. Control system according to claim 1 wherein at least one said parameter is ambient light level, and wherein the microprocessor includes means for threshold determination of ambient light level as between day and night conditions, the microprocessor operating to provide relative shifting of different levels of illumination of the light source according to day and night conditions.

18. Control system according to claim 1 wherein at least one said parameter is deceleration experienced by the vehicle, and wherein the microprocessor includes means responsive to different levels of deceleration for providing different levels of illumination of the light source according to each of the different levels of deceleration.

19. Control system according to claim 1 wherein the microprocessor is configured for controlling the semiconductor control means by varying the duty cycle of a signal provided thereto, such that the duty cycle is determinative of levels of illumination of the light source.

20. In an illumination control system for vehicular use for automatically controlling the intensity of a signal light source as a function of at least one safety-affecting parameter, including a vehicular electrical power source for powering the light source, means for controlling energization provided by the power source for the light source by a change of the degree of energization thereof, means for sensing such a parameter, the improvement comprising means, responsive to the sensing means, for causing the energization controlling means to change the degree of energization of the light source in an accelerated degree in response to the sensed parameter, whereby to shorten the response time in perceiving change in intensity resulting from overcompensated energization.

21. In an illumination control system according to claim 20, the light source normally having thermal inertia, the means for causing the energization controlling means to change the degree of energization of the light source providing overdriving of the light source in changing the degree of energization, whereby to overcome such thermal inertia.

22. In an illumination control means according to claim 21, the degree of energization of the light source being changed to provide at least two levels of illumination, the overdriving providing accelerated change in transition from one level to another.

23. In an illumination control system according to claim 20, the light source being operative to provide transition to at least one normally steady level of illumination when energized, the means for causing the energization controlling means to change the degree of energization of the light source providing overdriving of the light source in transition to such steady level of energization for producing a level of illumination momentarily greater than the steady level of illumination.

24. An improved illumination control system for vehicular use for automatically controlling the intensity of a signal light source as a function of at least one safety-affecting parameter, comprising a vehicular electrical power source for powering the light source; controllable semiconductor means for controlling energization provided by the power source for the light source and capable of providing a plurality of different illumination states of the light source; at least one sensor for sensing such a parameter; microcontroller means, responsive to said at least one sensor, for controlling the semiconductor means as a function of such parameter and operative to cause the semiconductor means to vary energization provided by the power source to the light source for transition thereof between different illumination states according to a time-varying function acceleratively compensating for physiological inability to perceive change in said different intensity levels by overcompensated energization of the light source for at least one state, whereby to shorten response time in perceiving change in intensity resulting from energization of the light source.

* * * * *